(12) United States Patent
Xiong et al.

(10) Patent No.: US 9,313,528 B2
(45) Date of Patent: Apr. 12, 2016

(54) FILTERING LIVE STREAMING CONTENTS AND SERVICES

(75) Inventors: True Xiong, San Diego, CA (US); Leo Pedlow, Ramona, CA (US); Viral Mehta, San Diego, CA (US); Eric Holcomb, San Marcos, CA (US)

(73) Assignees: SONY CORPORATION, Tokyo (JP); SONY NETWORKS ENTERTAINMENT INTERNATIONAL LLC, Los Angeles, CA (US)

( * ) Notice: Subject to any disclaimer, the term of this patent is extended or adjusted under 35 U.S.C. 154(b) by 60 days.

(21) Appl. No.: 13/348,551

(22) Filed: Jan. 11, 2012

(65) Prior Publication Data
US 2013/0179587 A1  Jul. 11, 2013

(51) Int. Cl.
| | |
|---|---|
| G06F 15/16 | (2006.01) |
| H04N 21/218 | (2011.01) |
| H04N 21/2187 | (2011.01) |
| H04N 21/258 | (2011.01) |
| H04N 21/2668 | (2011.01) |
| H04N 21/643 | (2011.01) |

(52) U.S. Cl.
CPC ....... *H04N 21/2181* (2013.01); *H04N 21/2187* (2013.01); *H04N 21/25891* (2013.01); *H04N 21/2668* (2013.01); *H04N 21/64322* (2013.01)

(58) Field of Classification Search
USPC .......................................................... 709/231
See application file for complete search history.

(56) References Cited

U.S. PATENT DOCUMENTS

| | | | |
|---|---|---|---|
| 7,116,894 B1 * | 10/2006 | Chatterton | 386/211 |
| 7,185,355 B1 * | 2/2007 | Ellis et al. | 725/46 |
| 8,433,299 B2 * | 4/2013 | Rao | 455/414.1 |
| 2002/0154157 A1 * | 10/2002 | Sherr et al. | 345/716 |
| 2004/0128386 A1 * | 7/2004 | Oomoto | H04L 69/329 709/226 |
| 2004/0193704 A1 * | 9/2004 | Smith | 709/220 |
| 2006/0041829 A1 * | 2/2006 | White | 715/500.1 |
| 2006/0159109 A1 * | 7/2006 | Lamkin et al. | 370/401 |
| 2008/0201748 A1 | 8/2008 | Hasek et al. | |
| 2008/0207182 A1 | 8/2008 | Maharajh et al. | |
| 2009/0183215 A1 * | 7/2009 | McCartie et al. | 725/105 |
| 2009/0259766 A1 | 10/2009 | Karlsson et al. | |
| 2009/0282440 A1 * | 11/2009 | Rodriguez | 725/60 |
| 2009/0317052 A1 * | 12/2009 | Sezan et al. | 386/52 |
| 2010/0125544 A1 * | 5/2010 | Lee | H04N 7/17318 706/54 |
| 2010/0223161 A1 * | 9/2010 | Hayashi et al. | 705/27 |
| 2011/0028221 A1 * | 2/2011 | Relyea et al. | 463/42 |
| 2011/0122319 A1 * | 5/2011 | Tenbarge | H04N 5/50 348/570 |
| 2011/0138334 A1 * | 6/2011 | Jung | 715/841 |
| 2011/0276996 A1 * | 11/2011 | Okazaki | H04L 12/2812 725/51 |
| 2011/0307934 A1 * | 12/2011 | Kuo | 725/116 |
| 2012/0084815 A1 * | 4/2012 | Shi | H04H 60/72 725/39 |

(Continued)

FOREIGN PATENT DOCUMENTS

WO    2006/069967 A1    7/2006

*Primary Examiner* — Joshua Joo
(74) *Attorney, Agent, or Firm* — Procopio, Cory, Hargreaves & Savitch, LLP

(57) ABSTRACT

Filtering contents and services streamed live to a client device, including: establishing a private relationship between a server and the client device; determining capabilities of the client device and preferences of a user of the client device; and filtering and transmitting a list of servers, services, and contents with contents and services that are at least one of: (a) preferred; and (b) capable of being presented, viewed, played, or processed on the client device. Keywords include live media stream and content filtering.

8 Claims, 4 Drawing Sheets

(56) References Cited

U.S. PATENT DOCUMENTS

| | | | |
|---|---|---|---|
| 2012/0110317 A1* | 5/2012 | Scheer et al. | 713/150 |
| 2012/0192217 A1* | 7/2012 | Jeong | H04N 21/252 725/14 |
| 2013/0006765 A1* | 1/2013 | Lee | 705/14.53 |
| 2013/0054958 A1* | 2/2013 | Braness et al. | 713/150 |
| 2013/0173418 A1* | 7/2013 | Goad et al. | 705/26.7 |
| 2014/0040942 A1* | 2/2014 | Ellis et al. | 725/30 |

* cited by examiner

FILTERING LIVE STREAMING CONTENTS AND SERVICES

BACKGROUND

1. Field of the Invention

The present invention relates to live streaming of contents and services, and more specifically, to filtering contents and services being streamed live to client devices.

2. Background

The Internet as a global network for delivery of audio and video content is increasing in popularity due to a number of technical advancements such as 3 and 4G, which creates both opportunities and challenges to content and service providers. Providing live streaming contents and service without filtering is one of the challenges faced by the providers.

SUMMARY

The present invention provides for filtering contents and services streamed live to a client device.

In one implementation, a method of filtering contents and services streamed live to a client device is disclosed. The method includes: establishing a private relationship between a server and the client device; determining capabilities of the client device and preferences of a user of the client device; and filtering and transmitting a list of servers, services, and contents with contents and services that are at least one of: (a) preferred; and (b) capable of being presented, viewed, played, or processed, on the client device.

In another implementation, a system for filtering contents and services streamed live to a client device is disclosed. The system includes: a processor configured to establish a private relationship between the system and the client device, and to determine capabilities of the client and preferences of a user of the client device; a content and service filter configured to filter and transmit a list of servers, services, and contents with contents and services that are at least one of: (a) preferred; and (b) capable of being presented, viewed, played, or processed, on the client device.

In another implementation, a non-transitory computer storage medium storing a computer program to filter contents and services streamed live to a client device is disclosed. The computer program includes executable instructions that cause a computer to: establish a private relationship between a server and the client device; determine capabilities of the client device and preferences of a user of the client device; and filter and transmit a list of servers, services, and contents with contents and services that are at least one of: (a) preferred; and (b) capable of being presented, viewed, played, or processed, on the client device.

Other features and advantages of the present invention will become more readily apparent to those of ordinary skill in the art after reviewing the following detailed description and accompanying drawings.

DETAILED DESCRIPTION

Contents and services involving concerts, sporting events, movies, conferences, or other similar events can be streamed live to client devices. Moreover, the contents and services can be streamed live over a communications protocol such as the Internet Protocol (IP), which is a primary protocol that delivers data packets from a source host (e.g., a server) to client devices based on their addresses. However, it should be noted that the communications protocol is not limited just to existing client-server communications protocols, but to other present and future client-server communications protocols.

Certain implementations as described herein provide for filtering contents and services being streamed live to the client devices. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

Figure 1A:
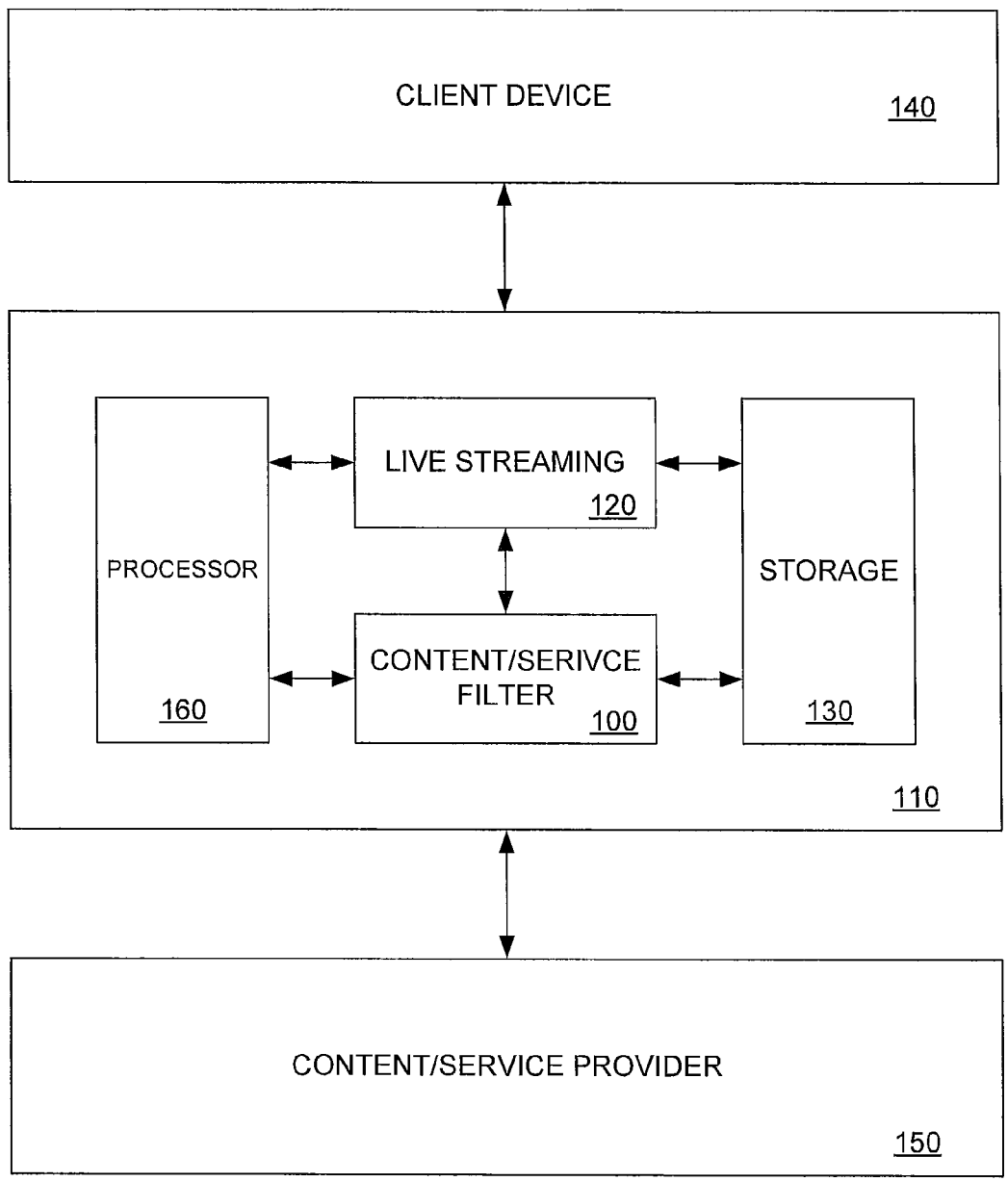
FIG. 1A is a functional block diagram of a server including a content and service filter in accordance with one implementation of the present invention.

FIG. 1A is a functional block diagram of a server 110 including a content and service filter 100 in accordance with one implementation of the present invention. In the illustrated implementation of FIG. 1A, the server 110, which is in communication with a client device 140 and a content and service provider 150, also includes a processor 160, a live streaming unit 120 and storage 130. In one implementation, the server 110 is configured as a Bravia Internet Video Link (BIVL) system which provides video streaming and on-demand services accessible through a client device (e.g., home appliances such as a television). In another implementation, the client device 140 is configured as an Internet Protocol Television (IPTV) unit, which can provide partial or complete BIVL protocols. The IPTV unit can be a laptop, a Blu-ray disk player, a game console (e.g., Sony PS-3), a personal Internet viewer (e.g., Sony Dash), a digital television, a smart television (e.g., Google TV), or other similar device. However, each of these devices has different capabilities including a capability to provide live streaming. Therefore, there is a need to provide filtering of servers, services, and contents to the client device 140 to reflect the diverse capabilities of the different IPTV units. Accordingly, service and/or content lists transmitted from the server 110 to the client device will have only those services and/or contents that are capable of being presented, viewed, played, or otherwise processed on the client device 140.

The implementation of filtering contents and services being streamed live can be facilitated by configuring the streaming system within the infrastructure of an existing private relationship such as a server-client relationship. The existing private relationship between a client device and a server provides the ability for the client device to validate itself using a valid certificate over a secure protocol. Thus, once the private relationship is established between the client device and the server, capabilities of the client device and preferences of a user of the client device can be ascertained. For example, preferences include heuristic behaviors such as viewing, selecting, searching, processing and recommending content category, title, types, and other related parameters by the user. Another preference is a buying history of the user using IPTV units. From this, content/service providers and advertisers know which advertisements the users would be most interested and have the highest chance of being bought while watching TV or browsing on different IPTV units such as a home audio (HA), tablet, or smart phone. Advertisements can be different for each product category for a single user account or profile when a live streaming service, category, or content is being grayed out. Accordingly, the server is able to serve the client device with substantially higher satisfaction than before the information was made available to the server. For example, because of the established server-client relationship, the server will have information about the capability of the client device regarding whether the client device can receive, browse, search, recommend, bookmark, etc. live streaming services and/or contents. Hence, if it determined that the client device is not capable of performing the above-mentioned live streaming services and/or contents, the server will not put any live streaming services and/or contents on content and service lists being transmitted to the client device. Also, the server will not put any live streaming services and/or contents on content and service lists if there are other reasons such as user and/or business rules. Therefore, as described above, once the private relationship is established between the client device and the server, capabilities of the client device and preferences of the user of the client device can be obtained, processed, and mined.

In the illustrated implementation of FIG. 1A, the content and service filter 100 and the live streaming unit 120 are configured within the infrastructure of an existing private relationship between the server 110 and the client device 140. Since the existing private relationship provides the ability for the processor 160 of the server 110 to collect and store (e.g., in storage 130) various information related to the client device 140, the above-mentioned factors including the capabilities of the client device 140 and the preferences of a user of the client device 140 can be readily ascertained. Thus, when the client device 140 logs into the server 110 and requests a list of contents and services available to the client device 140, the content and service filter 100 will filter the contents and services from the list to show only those that are capable of being presented, viewed, played, or otherwise processed on the requesting client device 140.

Figure 1B:
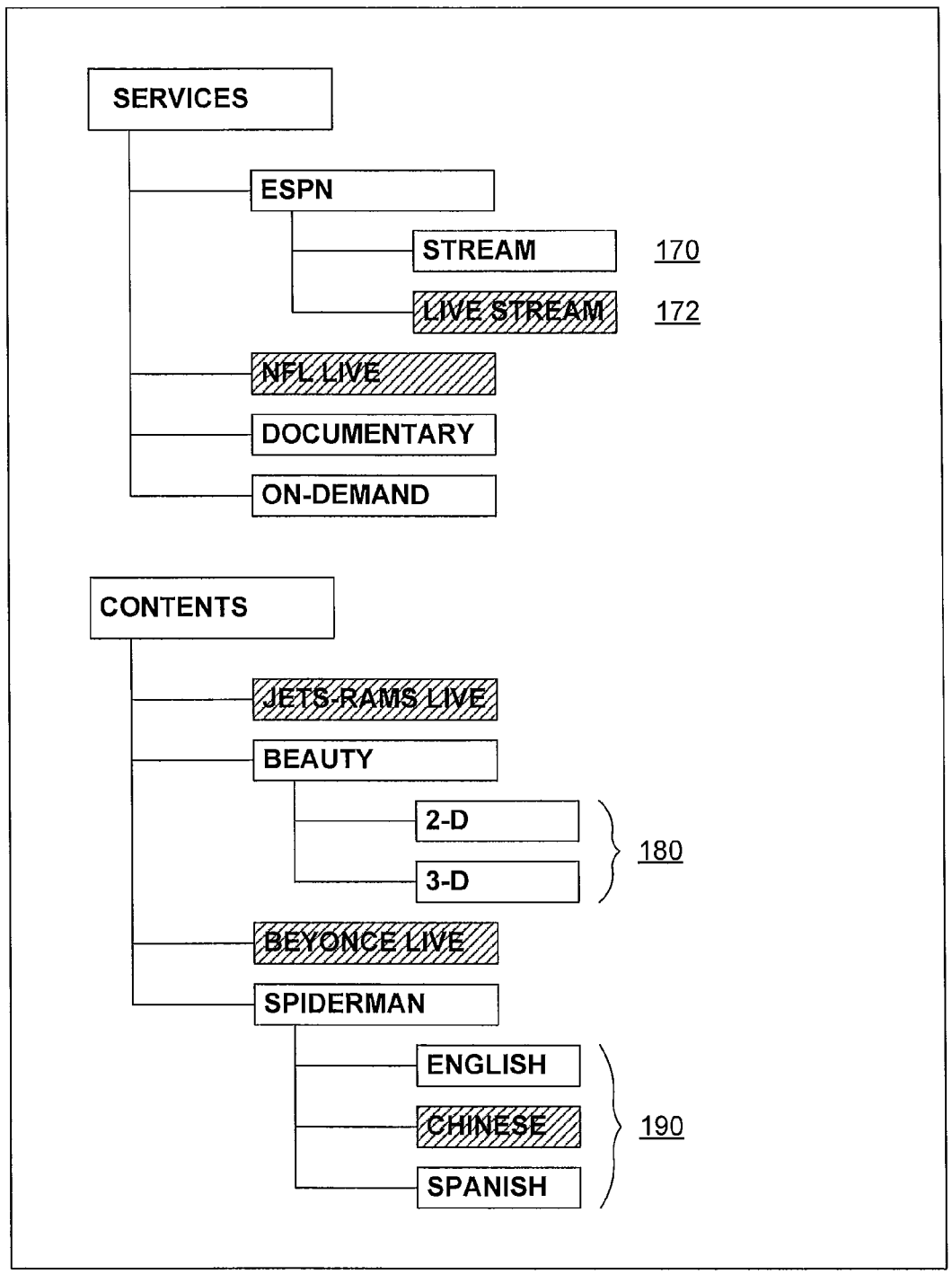
FIG. 1B shows a list of available contents and services transmitted to the client device.

For example, as shown in FIG. 1B, if it is determined that the client device 140 is not capable of receiving live stream contents and services, the list of available contents and services transmitted to the client device 140 will have the live stream contents and services shaded to indicate that they are not available to the client device. In the example of FIG. 1B, streaming ESPN service 170 is shown as available, whereas live streaming ESPN service 172 is shaded to indicate that it is not available. In an alternative, live streaming ESPN service can be removed from the list rather than being shaded. However, showing an unavailable service as a shaded box could provide an opportunity to advertise or recommend the service so that it can be activated upon payment or under promotion. Thus, the server 110 can include an advertisement unit (not shown) configured to transmit at least one of advertisement and recommendation to the client device to advertise or recommend the contents and services which are not preferred and not capable of being presented, viewed, played, or processed on the client device.

FIG. 1B further shows that the content and service filter 100 can filter other parameters such as 3-D 180 and language 190 capabilities. Other parameters include other filtering factors such as users' rating settings, locations where services and contents are allowed to do businesses, or services to products mappings. Thus, the content and service filter 100 is configured to operate at various different levels including a server level, a service level, and a content or asset level.

In another implementation, live streaming contents and services can be put into one server. When a client device makes a request for a list of servers, all server types are returned and the client device can choose to request contents and services from a live streaming server. Thus, in this implementation, the filter is placed at the server level.

In one implementation, once the contents and services are filtered by the content and service filter 100, the live streaming unit 120 streams live contents and services involving concerts, sporting events, movies, conferences, or other similar events received from the content/service provider 150 to the client device 140. The contents and services can be streamed live over the Internet Protocol (IP) to deliver data packets from the server 110 to the client device 140.

Figure 2:
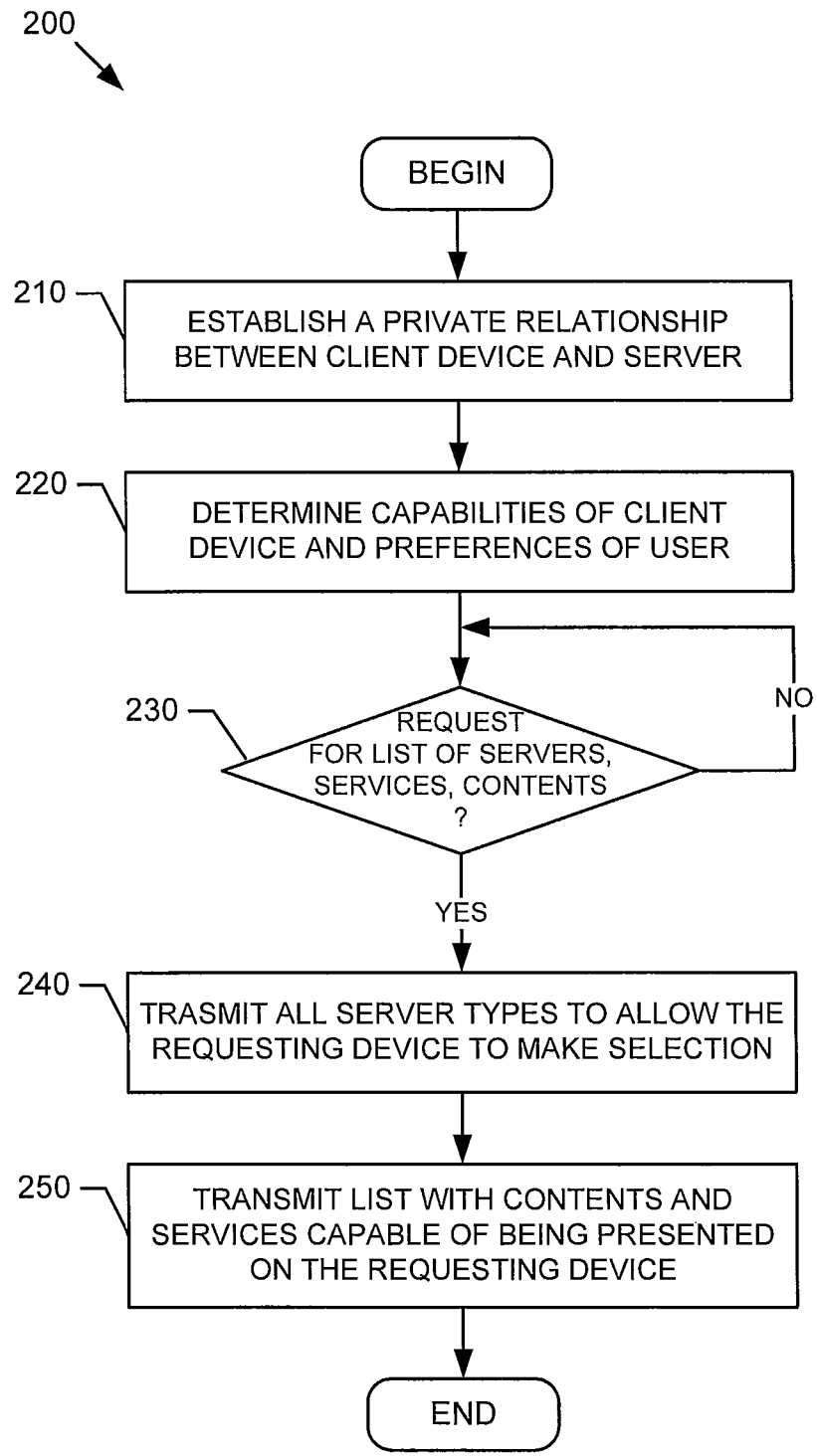
FIG. 2 is a flowchart illustrating a process for filtering contents and services streamed live to the client device in accordance with one implementation of the present invention.

FIG. 2 is a flowchart illustrating a process 200 for filtering contents and services streamed live to the client device in accordance with one implementation of the present invention. In the illustrated implementation of FIG. 2, a private relationship between a server and a client is established, at box 210. Once the private relationship is established, capabilities of the client device and preferences of a user of the client device are determined, at box 220. For example, because of the established server-client relationship, the server will have information about the capability of the client device regarding whether the client device can receive live streaming services and/or contents. Hence, if it determined that the client device is not capable of receiving live streaming services and/or contents, the server will not put any live streaming services and/or contents on content and service lists being transmitted to the client device. Thus, when a request is received from the client device, at box 230, for a list of servers, all server types are returned, at box 240, and the client device can choose to request contents and services from a live streaming server. In an alternative, a list of servers that includes contents and services that are capable of being presented, viewed, played, or processed on the client device is transmitted to the client device. Thus, in this implementation, the filter is placed at the server level.

Further, when a request is received from the client device, at box 230, for a list of contents and services available to the client device, the contents and services are filtered, at box 250, to show a list with those contents and services that are preferred (e.g., content in a specific language) and/or are capable of being presented, viewed, played, or otherwise processed (e.g., live .streaming capable) on the requesting client device 140. However, as discussed above, the contents and services that are not capable of being presented, viewed, played, or otherwise processed on the requesting client device 140 can be shown on the list differently from those that are available for presentation on the client device 140 (e.g., as shaded items). Further, showing an unavailable service or content differently could provide an opportunity to advertise or recommend the service or content so that it can be activated upon payment or under promotion. Activating the unavailable service or content may include update to the client device so that the service and content can be presented, viewed, played, or otherwise processed on the client device.

Figure 3A:
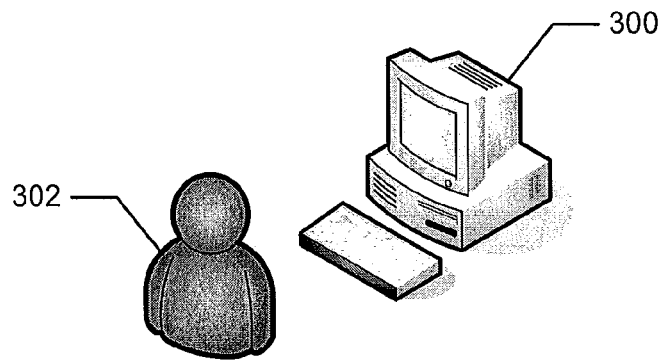
FIG. 3A illustrates a representation of a computer system and a user.

FIG. 3A illustrates a representation of a computer system 300 and a user 302. The user 302 uses the computer system 300 to process and filter contents and services. The computer system 300 stores and executes a content and service filter 390.

Figure 3B:
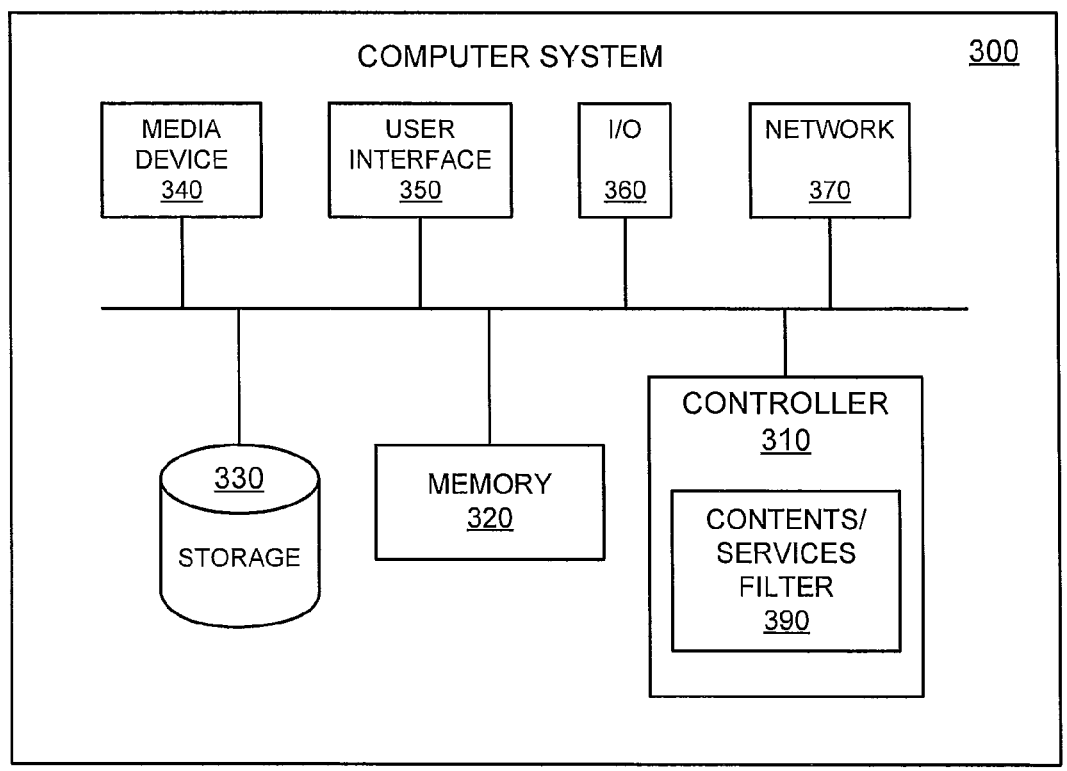
FIG. 3B is a functional block diagram illustrating the computer system hosting the content and service filter.

FIG. 3B is a functional block diagram illustrating the computer system 300 hosting the content and service filter 390. The controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the content and service filter 390 as a software system. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data temporarily or long term for use by other components of the computer system 300, such as for storing data used by the content and service filter 390. In one implementation, storage 330 is a hard disk drive. Since the client device has storage, streaming can include "progressive download" of a live event. In addition to streaming the event live, the event can be progressively downloaded to the storage and playback with delays of 5-10 minutes.

The media device 340 receives removable media and reads and/or writes data to the inserted media. In one implementation, for example, the media device 340 is an optical disc drive.

The user interface 350 includes components for accepting user input from the user of the computer system 300 and presenting information to the user. In one implementation, the user interface 350 includes a keyboard, a mouse, audio speakers, and a display. The controller 310 uses input from the user to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 302.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the implementations discussed above focus on live streaming contents and services, but the filtering of contents and services that are not live and/or non-streaming can also be performed. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of filtering contents and services streamed live to a client device, the method comprising:
    establishing a private relationship between a server and the client device,
    wherein the private relationship refers to a relationship in which the server has information about capabilities of the client device regarding whether the client device is able to receive, browse, search, recommend, or perform other functions related to processing the contents and services streamed live to the client device;
    determining the capabilities of the client device and preferences of a user of the client device;
    filtering and transmitting a list of servers, services, and contents with contents and services that are at least one of: (a) preferred; and (b) capable of being presented, viewed, played, or processed on the client device,
    wherein the list of servers, services, and contents are displayed as a listing of services comprising services that are preferred or capable of being presented, viewed, played or processed, and services that are not preferred and not capable of being presented, viewed, played or processed based on the preferences, and a listing of contents comprising content that are preferred or capable of being presented, viewed, played or processed, and content that are not preferred and not capable of being presented, viewed, played or processed based on the preferences,
    wherein the listing of services display the availability of services that are preferred or capable of being presented, viewed, played or processed differently than the services that are not preferred and not capable of being presented, viewed, played, or processed, and
    wherein the listing of contents display the availability of contents that are preferred or capable of being presented, viewed, played or processed differently than the contents that are not preferred and not capable of being presented, viewed, played, or processed;
    transmitting at least one of advertisement and recommendation to the client device to advertise or recommend contents and services which are not preferred and not capable of being presented, viewed, played, or processed on the client device so that the client device chooses the contents and services which are not capable of being presented, viewed, played, or processed on the client device; and
    activating the contents and services so that the contents and services which are not capable of being presented, viewed, played, or processed on the client device are presented, viewed, played, or processed on the client device.

2. The method of claim 1, wherein the capabilities of the client device comprises
    information about a capability of the client device regarding whether the client device can receive live streaming services and contents.

3. The method of claim 1, wherein the preferences of a user of the client device comprises
    information about whether the user of the client device prefers a particular language.

4. The method of claim 1, wherein filtering and transmitting a list of servers, services, and contents comprises directing live streaming contents and services that are preferred or capable of being presented, viewed, played, or processed on the client device into a server; and transmitting a list of servers.

5. A non-transitory computer storage medium storing a computer program to filter contents and services streamed live to a client device, the computer program comprising executable instructions that cause a computer to:

establish a private relationship between a server and the client device, wherein the private relationship refers to a relationship in which the server has information about capabilities of the client device regarding whether the client device is able to receive, browse, search, recommend, or perform other functions related to processing the contents and services streamed live to the client device;

determine the capabilities of the client device and preferences of a user of the client device;

filter and transmit a list of servers, services, and contents with contents and services that are at least one of: (a) preferred; and (b) capable of being presented, viewed, played, or processed on the client device, wherein the list of servers, services, and contents are displayed as a listing of services comprising services that are preferred or capable of being presented, viewed, played or processed, and services that are not preferred and not capable of being presented, viewed, played or processed based on the preferences, and a listing of contents comprising content that are preferred or capable of being presented, viewed, played or processed, and content that are not preferred and not capable of being presented, viewed, played or processed based on the preferences, wherein the listing of services display the availability of services that are preferred or capable of being presented, viewed, played or processed differently than the services that are not preferred and not capable of being presented, viewed, played, or processed, and wherein the listing of contents display the availability of contents that are preferred or capable of being presented, viewed, played or processed differently than the contents that are not preferred and not capable of being presented, viewed, played, or processed;

transmit at least one of advertisement and recommendation to the client device to advertise or recommend contents and services which are not preferred and not capable of being presented, viewed, played, or processed on the client device so that the client device chooses the contents and services which are not capable of being presented, viewed, played, or processed on the client device; and activate the contents and services so that the contents and services which are not capable of being presented, viewed, played, or processed on the client device are presented, viewed, played, or processed on the client device.

6. The storage medium of claim 5, wherein the capabilities of the client device comprises information about a capability of the client device regarding whether the client device can receive live streaming services and contents.

7. The storage medium of claim 5, wherein the preferences of a user of the client device comprises information about whether the user of the client device prefers a particular language.

8. The storage medium of claim 5, wherein the computer program comprising executable instructions that cause a computer to filter and transmit a list of servers, services, and contents comprises executable instructions that cause a computer to:

direct live streaming contents and services that are preferred or capable of being presented, viewed, played, or processed on the client device into a server; and transmit a list of servers.

* * * * *